(12) United States Patent
Walters

(10) Patent No.: US 6,568,162 B2
(45) Date of Patent: May 27, 2003

(54) CONTROL SYSTEM FOR A CUTTING ASSEMBLY OF A LAWN TRACTOR

(75) Inventor: Tracy Walters, Bowman, SC (US)

(73) Assignee: White Consolidated Industries, Inc., Cleveland, OH (US)

( * ) Notice: Subject to any disclaimer, the term of this patent is extended or adjusted under 35 U.S.C. 154(b) by 104 days.

(21) Appl. No.: 09/812,606

(22) Filed: Mar. 20, 2001

(65) Prior Publication Data
US 2001/0042363 A1 Nov. 22, 2001

Related U.S. Application Data
(60) Provisional application No. 60/190,862, filed on Mar. 20, 2000.

(51) Int. Cl.$^7$ .............................................. A01D 69/00
(52) U.S. Cl. ...................................... 56/10.8; 56/11.7
(58) Field of Search ................................ 56/10.8, 11.3, 56/11.5, 11.6, 11.7, 11.8, 14.7, 15.8, 16.7, 17.5, DIG. 6, DIG. 22; 475/200, 206; 180/76, 375, 19.1, 19.3

(56) References Cited

U.S. PATENT DOCUMENTS

| | | | | |
|---|---|---|---|---|
| 4,117,652 A | * | 10/1978 | Jones et al. | 180/19.1 |
| 4,694,942 A | * | 9/1987 | Ogano et al. | 192/13 A |
| 5,146,735 A | * | 9/1992 | McDonner | 180/19.3 |
| 5,850,758 A | * | 12/1998 | McCloud et al. | 74/371 |
| 6,098,386 A | * | 8/2000 | Shimizu et al. | 180/375 |

\* cited by examiner

Primary Examiner—Robert E. Pezzuto
(74) Attorney, Agent, or Firm—Pearne & Gordon LLP (57) ABSTRACT

An interlock system for use with a cutting assembly of a lawn tractor. The interlock system automatically disengages the cutting assembly when the lawn tractor is shifted into a reverse mode and prevents re-engagement of the cutter assembly when the law tractor is subsequently shifted into a non-reverse mode.

16 Claims, 5 Drawing Sheets

CONTROL SYSTEM FOR A CUTTING ASSEMBLY OF A LAWN TRACTOR

This application claims the benefit of U.S. Provisional Application Ser. No. 60/190,862 filed Mar. 20, 2000, the entire contents of which are incorporated herein by reference in their entirety.

BACKGROUND OF THE INVENTION

This invention relates to lawn mowers in general and, more particularly, to systems for controlling the cutting assemblies of lawn tractors.

It is known to provide a lawn mower with an electrical or mechanical interlock system to prevent a mower from being shifted to reverse with the cutting assembly operating. Some conventional interlock systems shut the lawn mower completely down when it is shifted into reverse. Other systems simply prevent the mower from being shifted into reverse while the cutting assembly is engaged. These require the user to disengage the cutting assembly prior to shifting the mower into reverse. Accordingly, there is a need in the art for an improved interlock system for disengaging a cutting assembly when a lawn tractor is shifted into a reverse mode.

SUMMARY OF THE INVENTION

The present invention provides an apparatus for engaging and disengaging a cutter of a vehicle. The apparatus includes a shifter for selecting a direction of travel of the vehicle. A clutch controls transmission of power to the cutter. Means for operating the clutch disengages the power from the cutter when the shifter is operated to select a reverse direction for the vehicle. The clutch operating means does not engage power to the cutter when the shifter is operated to select a forward direction for the vehicle.

According to one aspect, the present invention is an apparatus for engaging and disengaging a clutch assembly used with a cutter assembly housed within a cutting deck mounted on a chassis of a lawn tractor having an engine also mounted on the chassis and operable to provide power to a plurality of tractor wheels to which the chassis is mounted and to a cutting blade included in the cutter assembly and enclosed by the cutting deck. The apparatus for engaging and disengaging the clutch assembly comprises: a clutch bracket mounted to the chassis of the lawn tractor; a deck engage lever movably connected to the clutch bracket; a deck engage bracket movably connected to the deck engage lever and to a deck control cable having a deck control cable first end that is operatively connected to the clutch assembly; a release latch connected to the deck engage bracket and to a reverse control cable having a reverse control cable first end that is movably joined to a transmission shift lever that is operatively connected with a transmission of the lawn tractor; and a switch housing secured to the clutch bracket, the switch housing including a starter interlock switch operable within an electrical circuit utilized to supply power to a starter that is operatively connected to the engine, the starter interlock switch including an actuator having a retracted position and an extended position, the transmission shift lever having a reverse position and a non-reverse position, the release latch having a latched position and an unlatched position, the deck engage bracket having neutral position and an active position, the deck engage lever having an engaged position and a disengaged position, and the clutch assembly having a drive position and a release position.

When the deck engage lever is in the disengaged position and the transmission shift lever is in the non-reverse state, the deck engage bracket is latched to the deck engage lever, and when the deck engage lever is subsequently moved to the engaged state, the deck engage lever carries the release latch to the latched position and the deck engage bracket to the active position, thereby connecting power from the engine to the clutch assembly and causing the clutch assembly to be in the driven position.

Additionally, when the transmission shift lever is moved from the non-reverse state to the reverse state while the clutch assembly is in the driven state, the reverse control cable moves the release latch to the unlatched position and unlatches the deck engage bracket from the deck engage lever, permitting the deck engage bracket to move, under a spring force created by a first spring and a second spring included in the clutch assembly, to the neutral position, thereby causing the clutch assembly to change from the drive position to the release position and disconnecting power from the engine to the clutch assembly.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 1:
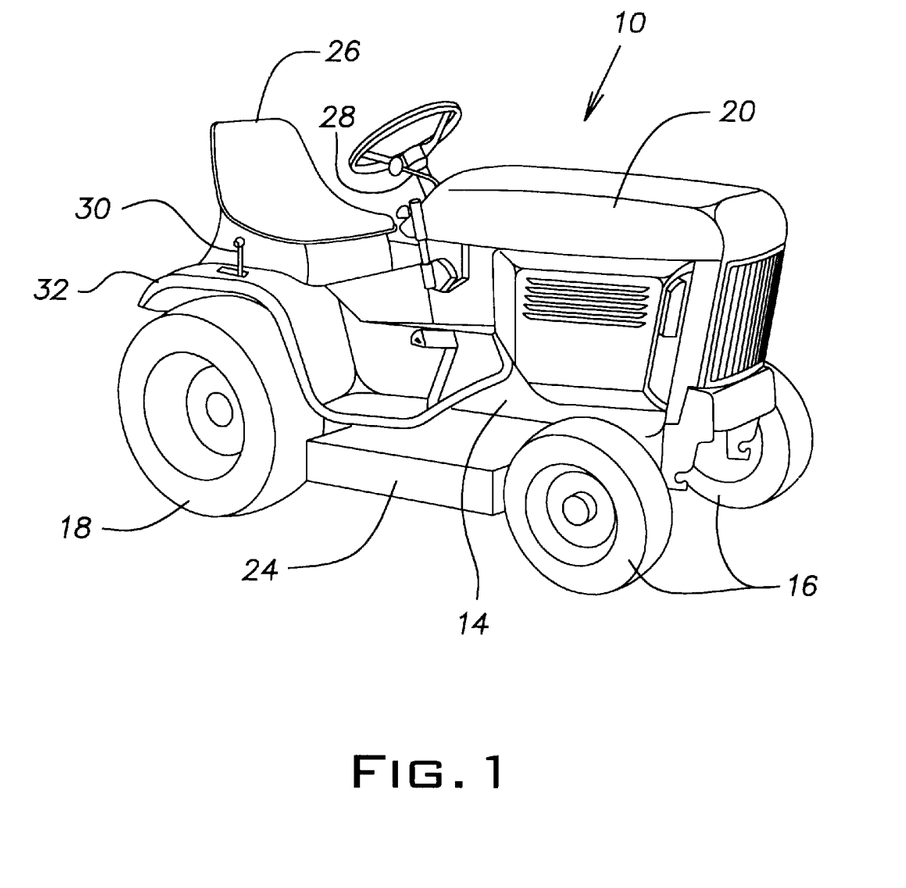
FIG. 1 shows a perspective view of a lawn tractor having a deck disengagement apparatus embodied in accordance with the present invention.

Referring now to FIG. 1, there is shown a lawn tractor 10 having a deck disengagement apparatus 12 (shown in FIGS. 3–5) embodied in accordance with the present invention. The lawn tractor 10 includes a chassis 14 mounted on front and rear wheels 16, 18. A body 20 is mounted on the chassis 14 and encloses an engine (not shown) for driving the rear wheels 18 and a cutter, such as a cutting blade 22 (shown in FIG. 2). The engine is connected to the rear wheels 18 through a transmission (not shown). A cutting deck 24 enclosing the cutting blade 22 is secured to the bottom of the chassis 14, between the front and rear wheels 16, 18. A seat 26 for an operator is mounted to the chassis 14, rearward of the engine. A dashboard (not shown) is mounted to the body 20 and faces the seat 26. A deck engage lever 28 extends from the dashboard. While FIG. 1 shows the deck engage lever 28 extending from the dashboard, it will be understood that the deck engage lever 28 may be located at and extend from any and all other desirable locations on the lawn tractor 10 and that any and all such other desirable locations are intended to be within the scope of the present invention.

A shifter, such as a shift lever 30, for controlling the transmission extends from a rear fender 32 of the body 20, adjacent to the seat 26. The shifter is movable between reverse, neutral, and drive positions. A first end of a reverse control cable 34 (shown in FIGS. 3–5) is connected to the shift lever 30. The reverse control cable is covered with an outer sheath 35.

Figure 2:
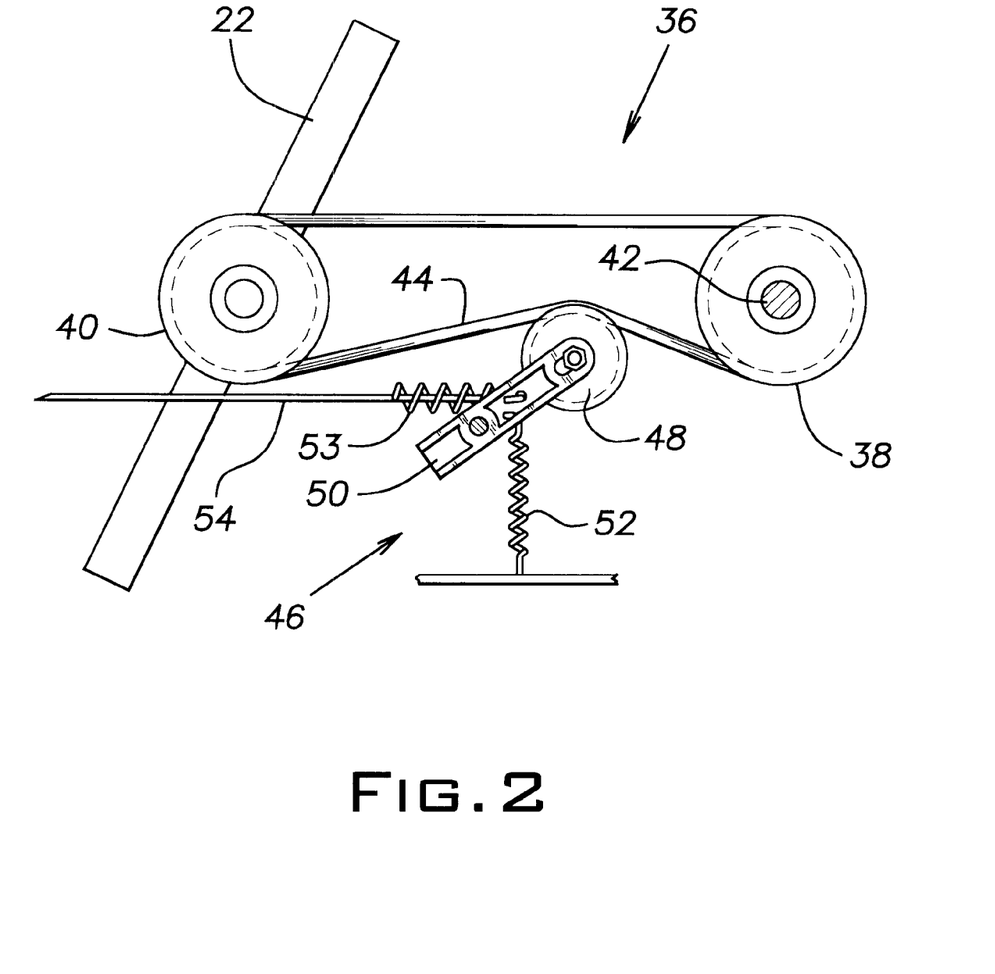
FIG. 2 shows a schematic view of a cutter assembly of the lawn tractor.

Referring now to FIG. 2, there is shown a schematic drawing of a cutter assembly 36 connected to the engine of the lawn tractor 10. The cutter assembly 36 includes an engine pulley 38 and a cutter pulley 40. The engine pulley 38 is secured to a drive shaft 42 of the engine so as to be rotatable therewith. The cutter pulley 40 is secured to the cutting blade 22 housed in the cutting deck 24 of the lawn tractor 10. An endless belt 44 is disposed around the engine pulley 38 and the cutter pulley 40. The belt 44 loosely engages the engine pulley 38 and the cutter pulley 40 so that power will not be transmitted from the engine pulley 38 to the cutter pulley 40 when the engine pulley 38 is rotating.

A clutch assembly 46 is disposed adjacent to the belt 44, between the engine pulley 38 and the cutter pulley 40. The clutch assembly 46 includes an idler pulley 48 carried by a pivotable arm 50. The clutch assembly 46 is movable between a release position (not shown), wherein the idler pulley 48 is spaced from the belt 44, and a drive position (shown in FIG. 2), wherein the idler pulley 48 engages and thereby tightens the belt 44. A coil spring 52 biases the clutch assembly 46 toward the release position. A first end of a deck control cable 54 is attached to the arm 50 of the clutch assembly 46 and is provided with a coil spring 53 that encircles the first end of the deck control cable 54 and has a first of its ends affixed to the arm 50 and a second of its ends joined to the cable 54. As will be discussed in more detail below, a second end of the deck control cable 54 is connected to the deck disengagement apparatus 12 of the present invention. The deck control cable is covered by an outer sheath 55.

Figure 3:
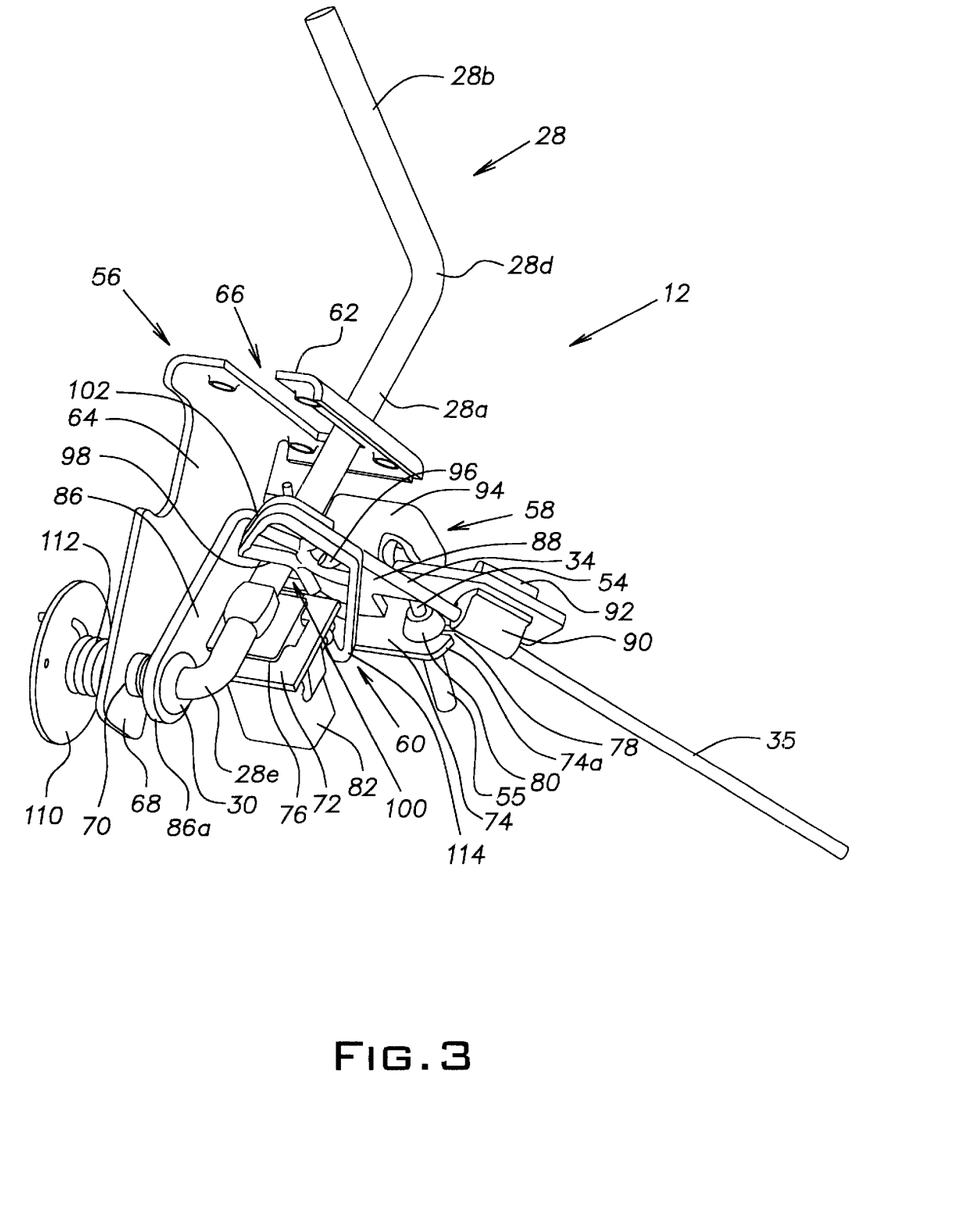
FIG. 3 shows a front perspective view of the deck disengagement apparatus.
Figure 4:
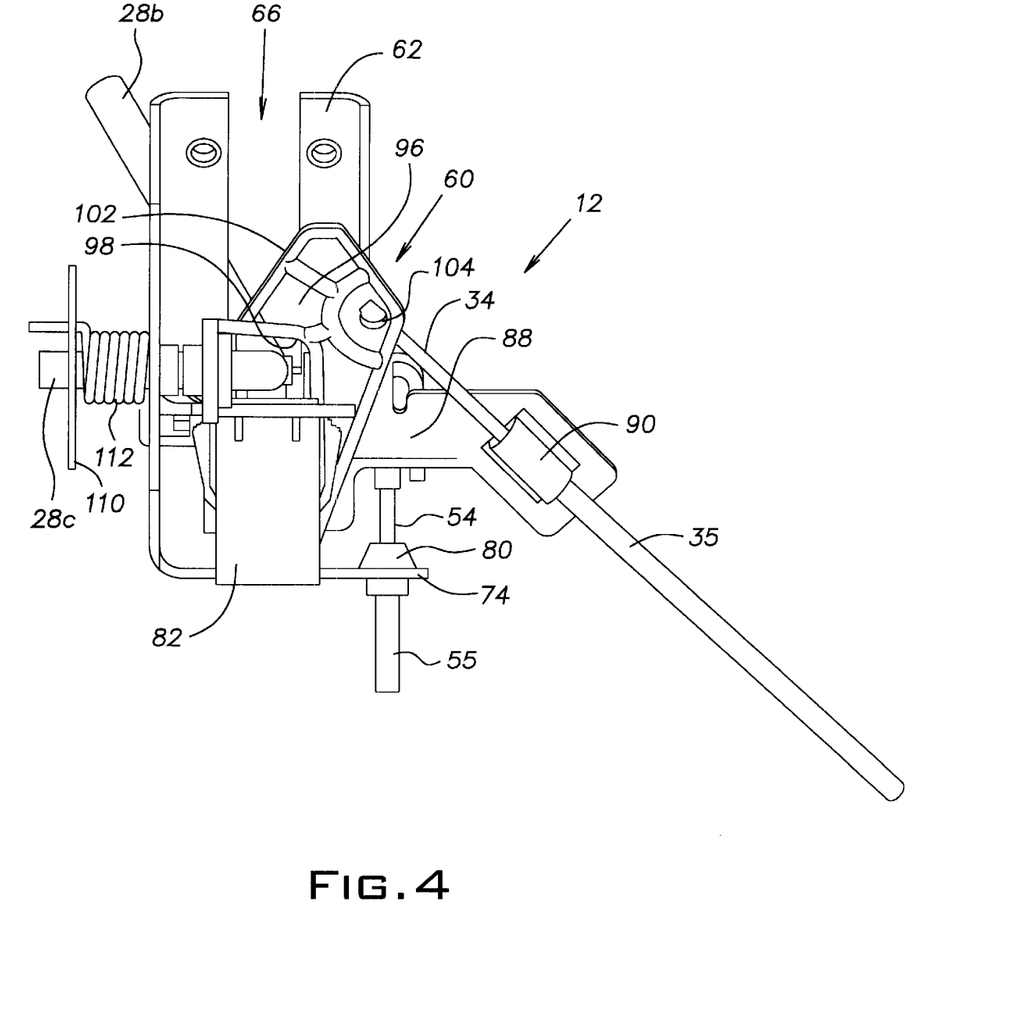
FIG. 4 shows a front view of the deck disengagement apparatus.
Figure 5:
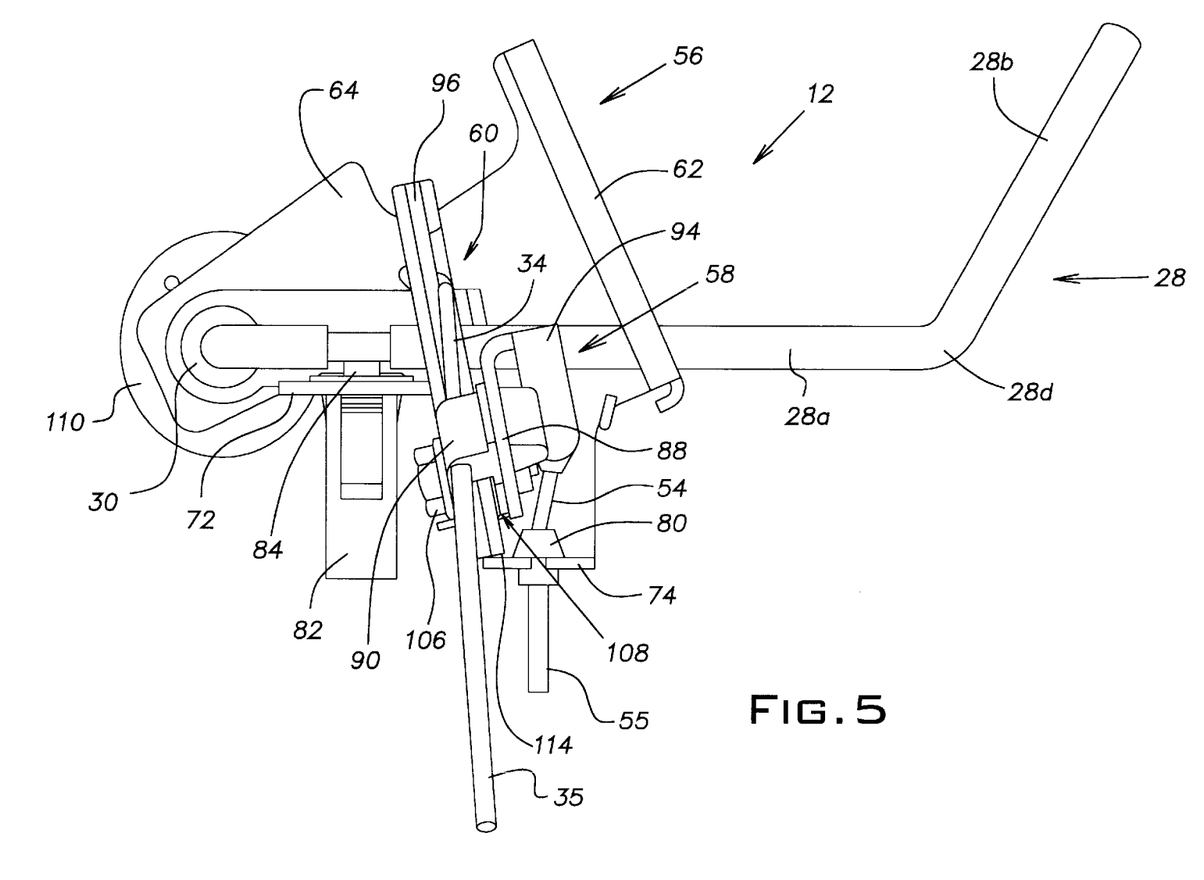
FIG. 5 shows a right side view of the deck disengagement apparatus.

Referring now to FIGS. 3–5, there is shown the deck disengagement apparatus 12 of the present invention. The deck disengagement apparatus 12 generally includes the deck engage lever 28, a clutch bracket 56, a deck engage bracket 58, and a release latch 60.

The deck engage lever 28 is formed from an elongated metal rod and includes a central portion 28a joined between an upper handle portion 28b and a lower mounting portion 28c (see FIG. 4). The upper handle portion 28b is joined to the central portion at an upper bend 28d forming an obtuse angle, while the mounting portion 28c is joined to the central portion 28a at a lower bend 28e forming a generally right angle. An annular flange 29 is disposed around the mounting portion 28c, toward the lower bend 28e.

The clutch bracket 56 includes a base portion 62 joined at a substantially right angle to a main portion 64. A linear slot 66 is formed in the base portion 62 and includes a closed end and an open end. The main portion 64 has a narrowed outer end 68 with a hole 70 extending therethrough. A first arm portion 72 and a second arm portion 74 extend from a side edge of the main portion 64. The first arm portion 72 has an enlarged central opening 76 formed therein. The second arm portion 74 is L-shaped and includes an outer end 74a having a slotted-opening 78 formed therein. A grommet 80 is secured within the slotted-opening 78.

A switch housing 82 is securely disposed within the central opening 76 of the first arm portion 72. The switch housing 82 encloses a starter interlock switch connected into a circuit for supplying power to an electric starter (not shown) for the engine. The starter interlock switch includes a plunger-type actuator 84 (see FIG. 5) that extends outwardly from the switch housing 82. The actuator 84 is movable between a retracted position, wherein the starter interlock switch closes the circuit to permit power to be supplied to the starter, and an extended position, wherein the starter interlock switch opens the circuit to cut-off power to the starter. The actuator 84 is biased toward the extended position.

The deck engage bracket 58 is generally L-shaped and includes a leg portion 86 joined at a generally right angle to a body portion 88. The leg portion 86 includes an outer end 86a with a hole extending therethrough. The body portion 88 has an outer end with first and second guides 90, 92 respectively secured to inner and outer surfaces thereof. A passage extends through the length of the first guide 90. A cowled cable mount 94 is joined to the body portion 88 and extends outwardly therefrom.

The release latch 60 includes a generally C-shaped body 96 having a top interior edge 98 that partially defines an enlarged opening 100. A top portion of the release latch 60 has a sloping or cammed front edge 102. A top opening 104 (see FIG. 4) is formed in the top portion of the release latch 60, and a bottom opening is formed in a bottom portion of the release latch 60. The release latch 60 is positioned to have the enlarged opening 100 face the leg portion 86 of the deck engage bracket 58, and is pivotally secured to the deck engage bracket 58 by a bolt 106 (see FIG. 5) extending through the bottom opening and an opening in the body portion 88 of the deck engage bracket 58. The release latch 60 is movable between a first or latched position, wherein the front edge 102 is disposed proximate the leg portion 86 of the deck engage bracket 58, and second or unlatched position, wherein the front edge 102 is disposed distal to the leg portion 86. A coiled latch return spring 108 (see FIG. 5) is disposed over the bolt 106, between the release latch 60 and the body portion 88 of the deck engage bracket 58. Ends of the latch return spring 108 respectively engage the release latch 60 and the body portion 88. The latch return spring 108 is operable to bias the release latch 60 toward the latched position.

A bent second end of the reverse control cable 34 is attached to the release latch 60 through the top opening 104. The reverse control cable 34 extends from the release latch 60 through the passage of the first guide 90 to the shift lever 30 for the transmission of the lawn tractor 10. The outer sheath 35 of the reverse control cable 34 terminates within, and is secured to, the first guide 90. The first end of the reverse control cable 34 is connected to the shift lever 30 such that the reverse control cable 34 moves the release latch 60 to the unlatched position when the shift lever 30 is moved into the reverse position and allows the release latch 60 to move back to the latched position when the shift lever 30 is moved into the neutral position or the drive position.

The second end of the deck control cable 54 is secured to the cable mount 94 of the deck engage bracket 58. The deck control cable 54 extends from the cable mount 94 through the grommet 80 to the arm 50 of the clutch assembly 46 as described above. The outer sheath 55 of the deck control cable 54 terminates within, and is secured to, the grommet 80.

The clutch bracket 56 is secured to a dashboard of the lawn tractor 10. A J-shaped slot (not shown) is formed in the dashboard of the lawn tractor 10. The slot 66 in the clutch bracket 56 is aligned with a straight portion of the J-shaped slot. The mounting portion 28c of the deck engage lever 28 is journalled through the hole 70 in the main portion 64 of the clutch bracket 56, thereby pivotally mounting the deck engage lever 28 to the clutch bracket 56. The central portion 28a of the deck engage lever 28 extends through the slot 66 and the J-shaped slot. With the deck engage lever 28 mounted in this manner, the deck engage lever 28 is movable from a first or disengaged position located at the closed end of the slot 66 (and a closed end of the straight portion of the J-shaped slot) to a second or engaged position located at a closed end of a hook portion of the J-shaped slot. When the deck engage lever 28 is moved to the disengaged position, the deck engage lever 28 engages the actuator 84 of the starter interlock switch and moves the actuator 84 to the retracted position.

A washer locator 110 is secured to the mounting portion 28c of the deck engage lever 28 on an outer side of the clutch bracket 56. A coiled return spring 112 is disposed over the mounting portion 28c, between the washer locator 110 and the clutch bracket 56. Ends of the return spring 112 respectively engage the washer locator 110 and the clutch bracket 56. The return spring 112 is operable to bias the deck engage lever 28 toward the disengaged position.

The deck engage bracket 58 is pivotally mounted to the mounting portion 28c of the deck engage lever 28, which extends through the hole in the leg portion 86 of the deck engage bracket 58. The leg portion 86 is disposed between the annular flange 29 on the deck engage lever 28 and the clutch bracket 56. The deck engage bracket 58 is movable between a neutral position, wherein a bottom edge 114 (see FIG. 5) of the release latch 60 abuts the second arm 74 of the clutch bracket 56, to an active position, wherein the deck engage bracket 58 is latched to the deck engage lever 28 and the deck engage lever 28 is in the engaged position.

When the deck engage lever 28 is in the disengaged position and the shift lever 30 is in the neutral position (or the drive position), the central portion 28a of the deck engage lever 28 extends through the enlarged opening 100 in the release latch 60 and is aligned below the top interior edge 98 of the release latch 60. With the deck engage lever 28 and the release latch 60 so positioned, the release latch 60 and, thus, the deck engage bracket 58, are latched to the deck engage lever 28.

The operation of the lawn tractor 10 and the deck disengagement apparatus 12 will now be described. The description will begin with the lawn tractor 10 being in an inactive or stored condition, wherein the engine is not running, the shift lever 30 is in the neutral position, and the deck engage lever 28 is in the disengaged position. When the lawn tractor 10 is in the stored condition, the deck engage bracket 58 is latched to the deck engage lever 28, and the starter interlock switch is closed. Thus, the starter may be provided with power to start the engine. When the engine is running, the drive 42 shaft and the engine pulley 38 rotate.

At this point, it should be noted that the engine cannot be started when the deck engage lever 28 is in the engaged position because the deck engage lever 28 will be spaced from the actuator 84 of the starter interlock switch. Thus, the actuator 84 will be in the extended position and, thus, the circuit will be open, thereby preventing power from being supplied to the starter.

When the deck engage lever 28 is moved to the engaged position, the central portion 28a contacts the top interior edge 98 of the release latch 60 and carries the release latch 60 to the active position against the face 68 of the bracket 56. The movement of the deck engage bracket 58 to the active position, pulls the deck control cable 54, which moves the clutch assembly 46 to the drive position. As a result, the belt 44 tightens and power from the engine is transmitted to the cutter pulley 40, thereby rotating the cutting blade 22, i.e., engaging the cutter assembly 36.

If the shift lever 30 is moved to the reverse position while the cutter assembly 36 is engaged, the reverse control cable 34 moves the release latch 60 to the unlatched position. As a result, the deck engage bracket 58 becomes disengaged from the deck engage lever 28 and moves under the force the spring 52 and the spring 53 back to the neutral position. The movement of the deck engage bracket 58 to the neutral position, releases the deck control cable 54, which allows the spring 52 to move the clutch assembly 46 back to the release position. As a result, the belt 44 loosens and power from the engine is no longer transmitted to the cutter pulley 40, thereby disengaging the cutter assembly 36. A brake (not shown) may be provided to immediately stop the rotation of the cutting blade 22 when the cutter assembly 36 is disengaged.

Simply moving the deck engage lever 28 back to the disengaged position without moving the shift lever 30 out of the reverse position will not latch the deck engage bracket 58 onto the deck engage lever 28 again because the release latch 60 is still in the unlatched position. Thus, in order to move the deck engage bracket 58 back to the active position and re-engage the cutter assembly 36, the shift lever 30 must be moved to the neutral position or the drive position, and the deck engage lever 28 must be moved back to the disengaged position to permit the deck engage bracket 58 to latch onto the deck engage lever 28 again. The deck engage lever 28 may then be moved back to the engaged position to carry the deck engage bracket 58 to the active position and thereby re-engage the cutter assembly 36.

The order in which the deck engage lever 28 and the shift lever 30 are moved to their required positions for re-engaging the cutter assembly 36 is not important. If the shift lever 30 is moved out of the reverse position first, the release latch 60 will move back to the latched position below the deck engage lever 28. This is not a problem, however. When the deck engage lever 28 is subsequently moved to the disengaged position, the deck engage lever 28 contacts the cammed front edge 102 of the release latch 60, which translates some of the downward movement of the deck engage lever 28 to lateral movement of the release latch 60, away from the latched position. This lateral movement of the release latch 60 permits the deck engage lever 28 to move below the top interior edge 98 of the release latch 60. The release latch 60 then moves back to the latched position, thereby positioning the deck engage lever 28 within the enlarged opening 100 in the release latch 60 and below the top interior edge 98.

Although the preferred embodiments of this invention have been shown and described, it should be understood that various modifications and rearrangements of the parts may be resorted to without departing from the scope of the invention as disclosed and claimed herein.

What is claimed is:

1. An apparatus for engaging and disengaging a clutch assembly used with a cutter assembly housed within a cutting deck mounted on a chassis of a lawn tractor having an engine also mounted on the chassis and operable to provide power to a plurality of tractor wheels to which said chassis is mounted and to a cutting blade included in said cutter assembly and enclosed by said cutting deck, said apparatus comprising: a clutch bracket mounted to said chassis of said lawn tractor; a deck engage lever movably connected to said clutch bracket; a deck engage bracket movably connected to said deck engage lever and to a deck control cable having a deck control cable first end that is operatively connected to said clutch assembly; a release latch connected to said deck engage bracket and to a reverse control cable having a reverse control cable first end that is movably joined to a transmission shift lever that is operatively connected with a transmission of said lawn tractor; and a switch housing secured to said clutch bracket, said switch housing including a starter interlock switch operable within an electrical circuit utilized to supply power to a starter that is operatively connected to said engine, said starter interlock switch including an actuator having a retracted position and an extended position, said transmission shift lever having a reverse position and a non-reverse position, said release latch having a latched position and an unlatched position, said deck engage bracket having a neutral position and an active position, said deck engage lever having an engaged position and a disengaged position, and said clutch assembly having a drive position and a release position.

2. An apparatus according to claim 1, wherein said clutch bracket includes a clutch bracket main portion and a clutch bracket base portion, said clutch bracket base portion being joined to said clutch bracket main portion at a substantially right angle, said clutch bracket main portion including a clutch bracket main portion outer end, a clutch bracket main portion first arm and a clutch bracket main portion second arm, said clutch bracket main portion outer end being provided with a hole for rotatably receiving a lower mounting portion of said deck engage lever, said clutch bracket first arm forming an opening for receiving said switch housing, and said clutch bracket second arm having a second arm outer end forming a slotted opening for receiving a grommet and said clutch bracket base portion defining a clutch bracket base slot having a closed end and an open end.

3. An apparatus according to claim 2, wherein when said deck engage lever is in said disengaged state, a central portion of said deck engage lever is located at said closed end of said clutch bracket base slot and contacts said actuator of said starter interlock switch thereby causing said actuator to be in said retracted state.

4. An apparatus according to claim 2, wherein said deck engage bracket includes a deck engage bracket body portion and a deck engage bracket leg portion joined at a generally right angle to said deck engage bracket body portion, said deck engage bracket leg portion having a leg portion outer end provided with a leg portion outer end hole for rotatably receiving said lower mounting portion of said deck engage lever and said deck engage bracket body portion defining a deck engage bracket body portion opening and including a cowled cable mount connected to a second end of said deck control cable and a body portion outer end, said body portion outer end having a first guide secured to a first surface of said outer end and a second guide secured to a second surface of said outer end, said first guide defining a first guide passage that receives a second end of said reverse control cable.

5. An apparatus according to claim 4, wherein said release latch includes a release latch body, a release latch top portion and a release latch bottom portion, said release latch body having a top interior edge that defines an opening for receiving said deck engage lever when said deck engage lever is in said disengaged state, said release latch top portion forming a sloped front edge and a top opening that receives said second end of said reverse control cable, and said release latch bottom portion forming a release latch bottom portion opening and a release latch bottom portion bottom edge.

6. An apparatus according to claim 5, wherein said sloped front edge of said release latch top portion is located distal to said deck engage bracket leg portion when said release latch is in said unlatched position and said release latch top portion is located proximate to said deck engage bracket leg portion when said release latch is in said latched position.

7. An apparatus according to claim 5, wherein said release latch and said deck engage bracket are joined by a bolt, said bolt being received by said release latch bottom portion opening and by said deck engage bracket body portion opening.

8. An apparatus according to claim 7, wherein a coiled latch return spring is disposed around said bolt and between said release latch and said deck engage bracket body portion so as to bias said release latch toward said latched position.

9. An apparatus according to claim 5, wherein said release latch bottom portion bottom edge abuts said second arm of said clutch bracket when said deck engage bracket is in said neutral position.

10. An apparatus according to claim 4, wherein said lower mounting portion of said deck engage lever is received by an annular flange, a washer locator, and a coiled return spring, and wherein said annular flange abuts against said deck engage bracket leg portion, a first end portion of said coiled return spring is connected to said clutch bracket main portion, a second end portion of said coiled return spring is connected to said washer locator so as to bias said deck engage lever toward said disengaged position, and said washer locator is secured to said lower mounting portion of said deck engage lever.

11. An apparatus according to claim 10, wherein said coiled return spring is operable to bias said deck engage lever toward the disengaged position.

12. An apparatus according to claim 1, wherein when said deck engage lever is in said disengaged position and said transmission shift lever is in said non-reverse state, said deck engage bracket is latched to said deck engage lever, and when the deck engage lever is subsequently moved to said engaged state, the deck engage lever carries the release latch to said latched position and the deck engage bracket to said active position, thereby connecting power from said engine to said clutch assembly and causing said clutch assembly to be in said driven position.

13. An apparatus according to claim 12, wherein when said transmission shift lever is moved from said non-reverse state to said reverse state while said clutch assembly is in said driven state, said reverse control cable moves said release latch to said unlatched position and unlatches said deck engage bracket from said deck engage lever, permitting said deck engage bracket to move, under a spring force created by a first spring and a second spring included in said clutch assembly, to said neutral position, thereby causing said clutch assembly to change from said drive position to said release position and disconnecting power from said engine to said clutch assembly.

14. An apparatus according to claim 13, wherein when said transmission shift lever is returned to said non-reverse state from said reverse state after said clutch assembly has changed from said drive position to said release position and said deck engage lever is moved back to said disengaged position, said deck engage bracket latches onto said deck engage lever again and said deck engage lever can be moved to back to said engaged position and thereby carry said deck engage bracket back to said active position and return said clutch assembly to said drive position.

15. An apparatus for engaging and disengaging a cutter of a vehicle, said apparatus comprising: a shifter for selecting a direction of travel of the vehicle; a clutch for controlling transmission of power to the cutter; means for operating the clutch to disengage the power from the cutter when the shifter is operated to select a reverse direction for the vehicle.

16. An apparatus according to claim 15 wherein the clutch operating means does not engage power to the cutter when the shifter is operated to select a forward direction for the vehicle.

* * * * *